Feb. 17, 1959 E. F. ELMS 2,873,496
FASTENER
Filed Feb. 13, 1956
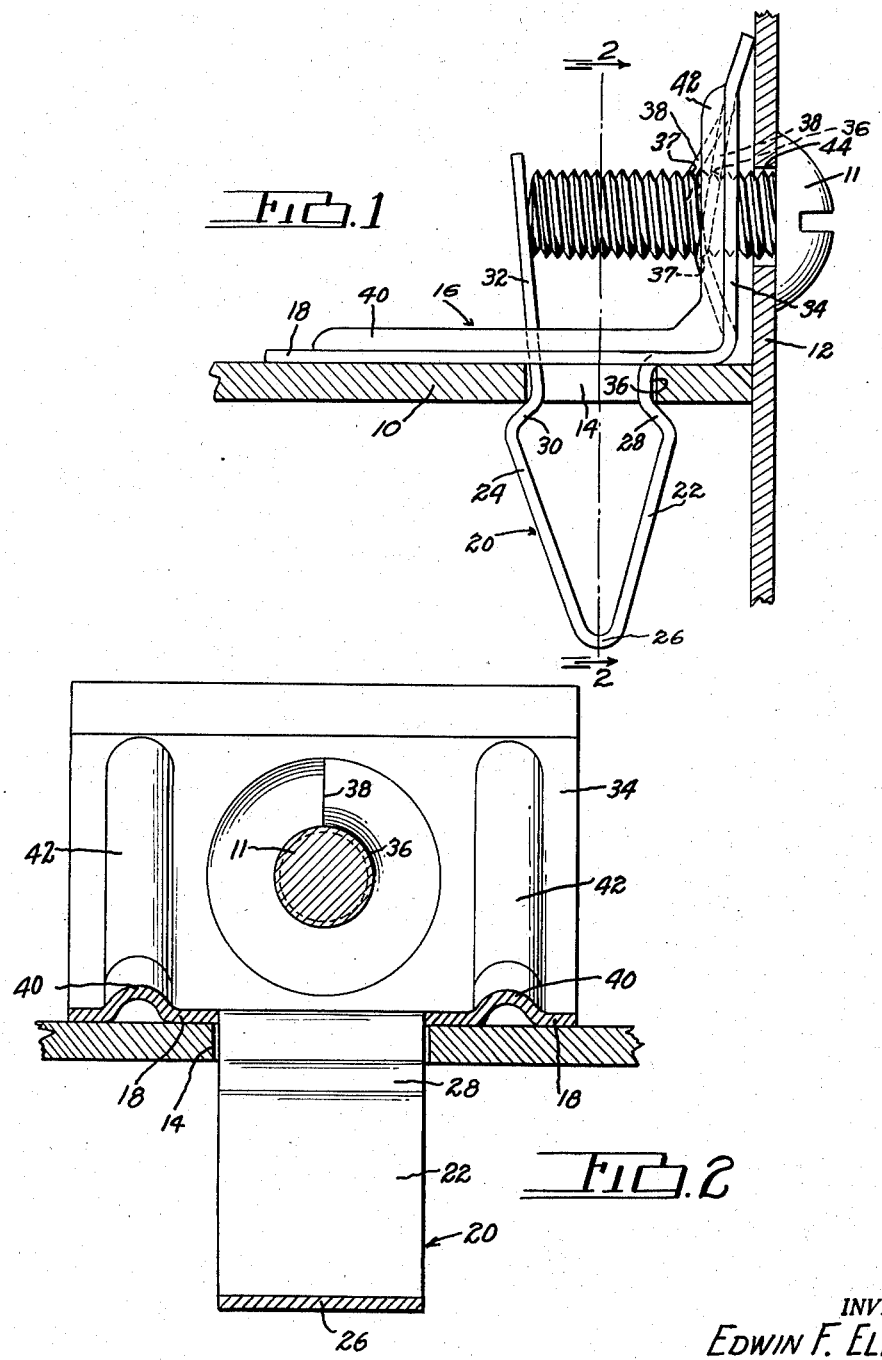
INVENTOR.
EDWIN F. ELMS
BY
ATTORNEY United States Patent Office 2,873,496
Patented Feb. 17, 1959

2,873,496
FASTENER

Edwin F. Elms, Roseville, Mich.

Application February 13, 1956, Serial No. 565,050

1 Claim. (Cl. 24—73)

This invention relates to a fastener and more particularly to a fastener of the resilient type which may be spring pressed into an opening in a panel and locked therein by a member which secures a part to the panel and to the fastener, the fastener serving as an interconnecting means between the panel and the part to be secured thereto.

It is an object of the present invention to provide a single piece of sheet spring steel which may be bent and folded to desired shape, having a portion capable of contraction for spring pressure engagement in an opening through a panel and another portion which receives a part securing device to the panel, which securing device prevents contraction of the spring pressure engagement portion, thereby securely locking the fastener to the panel or support.

Another object of the invention is to provide a spring type fastener having a reversely bent back portion forming a pair of legs which are bowed outwardly intermediate their length to provide holding portions, to provide resiliency between the legs so that the over all width of the bowed out portions may be reduced when the reversely bent portion is inserted through an opening, to provide one of the legs with a screw thread engaging portion for receiving a screw, the threaded end of the screw having engagement with the other of said legs for spreading the legs apart, and to support a part to the fastener by the screw which spreads the legs apart.

Other objects and advantages of the invention will more fully appear from the following description taken in connection with the accompanying drawings, in which;

Fig. 1 is a cross sectional view of a supporting panel and a supported part, showing the improved fastener applied to the parts and in side elevational view; and Fig. 2 is a cross sectional view, taken on line 2—2 of Fig. 1.

Referring to the drawings, there is illustrated a supporting panel 10, shown in a horizontal plane, and a part 12 to be supported in a plane substantially at right angles to the supporting panel 10. The thickness of the supporting panel is less than the diameter of the securing means, such as a screw 11, for securing the part 12 to the support, so that to secure the parts together it would be necessary to turn a flange on one of the parts to which the securing means could be fastened. Flanging one of the parts has been found objectionable in that it requires more metal and such would not lend itself to supporting panels or parts of curved edge formation.

It has been found desirable to provide an aperture 14 through the supporting panel 10 which receives a spring pressed fastener to which the part 12 is attached in flush engagement with the outer edge of the supporting panel 10.

The fastener comprises a stamping having parts generally at right angles to each other or to conform to the respective planes of the supporting panel and the part to be supported. The base portion 16 is provided with a pair of spaced legs 18 and an intermediate strip 20 which is cut out of the base portion 16 and bent to form a resilient fastener. One leg 22 of the strip 20 is integrally connected to the base portion 16 and the other leg 24 is free for lateral movement between the spaced legs of the base portion 16.

The legs 22 and 24 are united at their outer ends 26, tapering upwardly and outwardly to cam shoulders 28 and 30 which are bent inwardly. The legs are then extended in substantially parallel relation; the one extremity 32 being free for resilient deflection toward and away from the other extremity 34 of the leg 22 which is integrally connected to the base portion 16. At the point of integral connection, the base portion 16 and the leg 22 form a groove 36 between the base 16 and cam shoulder 28 which receives one edge of the opening 14 in the panel 10. The extension 34 is an integral part of the base 16 bent out of the plane of the base 16.

The extension 34 is provided with an aperture 37 having a cut 38 extending radially outwardly from its periphery into the body of the extension 34. The metal around the aperture is pressed toward the extension 32 to frustoconical shape with the periphery of the aperture forming a helix substantially equal to the root diameter of a threaded bolt or screw which can be screw threaded into the aperture; the thickness of the metal being substantially equal the width of the spacing between the threads. A screw threaded aperture may also be provided to receive the bolt or screw 11.

The legs 18 of the base portion 16 are provided with ribs 40 which extend across the juncture of the extension 34 and the base 16 and extend into the extension 34, as at 42, on opposite sides of the aperture 37. These ribs 40 and 42 are for stiffening purposes to present rigidity to the base 16 and extension 34 and yet maintain the resiliency in the legs 20 and 22.

When the fastening device is to be used for securing a part to a panel, the fastener is applied to the panel 10 by inserting the outer ends 26 of the tapering legs 20 and 22 through the aperture 14. In so doing the legs 20 and 22 are forced toward each other until the cam shoulders 28 and 30 pass through the opening. The resiliency in the legs and the cam shoulders urge the legs 18 of the base portion 16 flush with the face of the panel 10 with the groove 36 fitting over an edge of the aperture 14. The extension 34 extends upwardly at an angle to the base 16, here shown to be ninety degrees. The bolt or screw 11 is then inserted through an aperture 44 in the part 12 and screw threaded through the aperture 37 in the extension 34. When the head of the screw 11 reaches contact with the outer surface of the part 12, further turning of the screw 11 draws the extension toward the part 12 and in so doing the fastener tightly draws the part 12 toward the edge of the panel 10 and in tight engagement therewith. The screw 11 is of a length to contact the extension 32 of the resilient fastener leg 24, when the screw is drawn up tightly on the part 12. This contact engagement of the screw end forces the extension tightly against the side of the aperture 14, opposite to the side engaged by the groove 36, and the extensions 32 and 34 are held in a spread apart position, securely locking the fastener to the panel 10 so that the cam surfaces 28 and 30 cannot pass through the aperture 14. The screw serves a dual function; that is, it locks the fastener to the panel 10 and locks the part 12 to the fastener in tight engagement with the edge of the panel 10.

Although but one specific embodiment of the invention has herein been shown and described, it will be understood that various changes in the size, shape and arrangement of parts may be made without departing from the spirit of the invention, and it is my intention to cover by the appended claim such changes as may be reasonably included within the terms thereof.

I claim:

A fastener for securing a part to an apertured supporting panel, said part extending in a plane at an angle to the plane of said supporting panel, comprising a fastener having a body portion, an integral strip struck out of the body portion having a bend providing a pair of spaced relatively yieldable leg members projecting downwardly from said body for insertion through an aperture in the supporting panel, inwardly off-set shoulders carried by said legs, for engagement with the under side of the panel, an extension on said body portion extending upwardly in a plane parallel to the plane of said part to be supported, an extension formed by the free end of said strip projecting upwardly through and above said body portion, said first named extension being provided with a screw threaded receiving aperture having its axis intersecting said second named extension, and screw threaded means for securing said first named extension to said part to be supported, said screw threaded means adapted for engagement with said second extension for urging it away from said first named extension.

References Cited in the file of this patent

UNITED STATES PATENTS

| | | |
|---|---|---|
| 1,549,632 | Trester | Aug. 11, 1925 |
| 2,108,347 | Quarnstrom | Feb. 15, 1938 |
| 2,376,167 | Mitchell | May 15, 1945 |
| 2,407,609 | Judd et al. | Sept. 10, 1946 |
| 2,735,519 | Frischmann | Feb. 21, 1956 |

FOREIGN PATENTS

| | | |
|---|---|---|
| 37,368 | Netherlands | Jan. 15, 1936 |
| 969,143 | France | May 17, 1950 |